March 11, 1930.  A. E. L. CHORLTON  1,750,571
INTERNAL COMBUSTION ENGINE
Original Filed May 22, 1924

INVENTOR
A. E. L. Chorlton,
BY Watson, Coit, Morse & Grindle
ATTYS.

Patented Mar. 11, 1930

1,750,571

UNITED STATES PATENT OFFICE

ALAN ERNEST LEOFRIC CHORLTON, OF LONDON, ENGLAND, ASSIGNOR OF ONE-HALF TO WILLIAM BEARDMORE, OF LONDON, ENGLAND

INTERNAL-COMBUSTION ENGINE

Original application filed May 22, 1924, Serial No. 715,231, and in Great Britain May 29, 1923. Divided and this application filed November 13, 1925. Serial No. 68,859. Renewed June 19, 1928.

This is a divisional application on the present applicant's patent application of the United States of America Serial No. 715,231.

The present invention relates to internal combustion engines and has for its object to provide an improved form of engine of the kind in which part or all of the fluid is delivered into the combustion chamber in a liquid state.
According to this invention a combustion chamber is formed in the head of the cylinder and provided with means for injecting fuel in a liquid state into this combustion chamber, while a sleeve valve controls the flow of gases into and out from the cylinder through suitably disposed ports. In this construction it is preferable to provide a somewhat constricted passage or opening between the combustion chamber and the cylinder the piston stroke being then determined so that substantially the whole of the gaseous charge is compressed within the combustion chamber thus producing desirable turbulence. Such an arrangement is especially suitable for engines operating at high speed. Conveniently the ports or passages through which the main part of the gaseous charge enters the cylinder are disposed radially while a series of radially disposed ports or passages lead from the combustion chamber and serve for the escape of the exhaust products, all these ports being controlled by the sleeve valve. The combustion chamber preferably has a substantially symmetrical bulblike formation and communicates with the cylinder through an opening having a diameter less than the maximum diameter of the bulb.

The invention may be carried out in various ways but the accompanying drawings illustrate by way of example one construction that may be adopted. In these drawings—

Like letters indicate like parts throughout the drawings.

Figure 1:
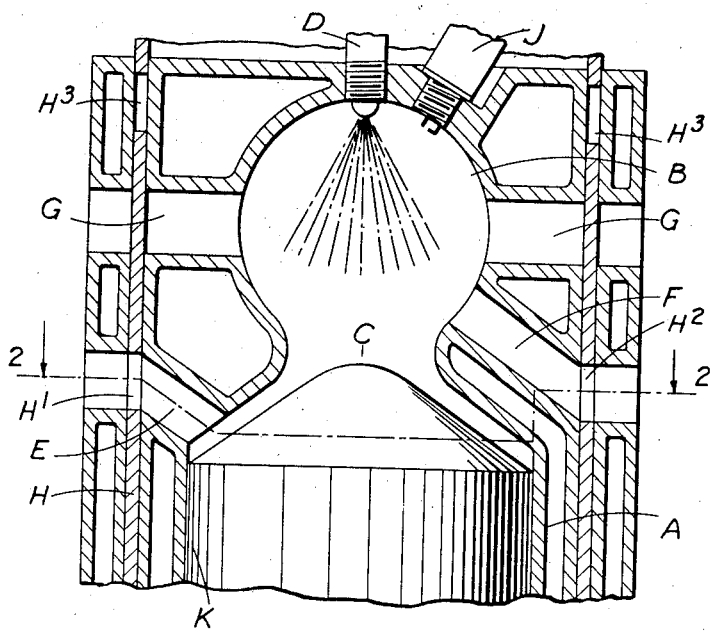
Figure 1 is a vertical sectional elevation of a cylinder head according to this invention the section being taken on the line 1—1 in Figure 2.

Referring to the construction illustrated the cylinder A has formed in its head a combustion chamber B the shape of which may conveniently be substantially spherical as shown in the drawings. This chamber B communicates with the end of the cylinder A by way of a somewhat constricted opening or passage C. An injector D by means of which liquid fuel can be delivered into the combustion chamber B is disposed preferably centrally as shown so that the fuel enters in a spray in such a manner as to thoroughly permeate the air in the combustion space.

Figure 2:
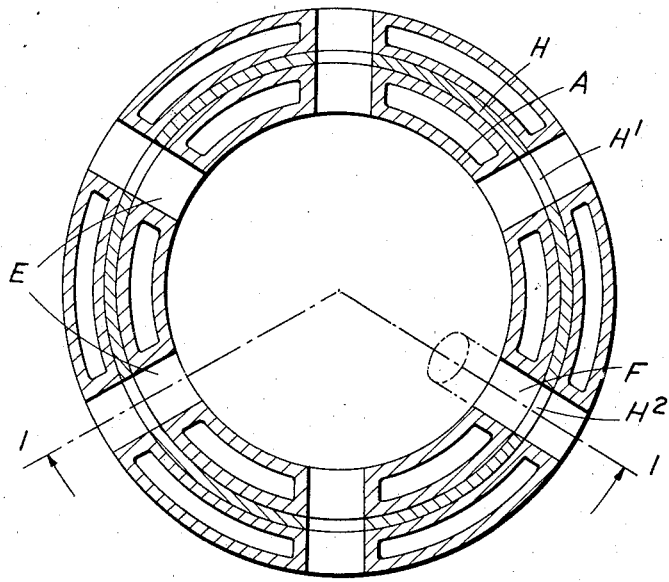
Figure 2 is a transverse section on the broken line 2—2 in Figure 1.

A series of short passages E which in effect may be little more than ports are formed radially in the cylinder head these ports or passages leading not directly into the combustion space B but into the end of the cylinder beyond the opening C. A single radially arranged port or passage F leads on the other hand directly into the combustion chamber B. The passages E and F are conveniently spaced apart at equal distances around the cylinder as shown in Figure 2. A series of radially arranged passages G open into the combustion chamber B substantially in the positions indicated in Figure 1. The flow of the gases into and out from the cylinder through the passages E, F and G is controlled by a sleeve valve H of suitable type and construction having therein ports $H^1$ $H^2$ and $H^3$ adapted to register with the ports at the end of the passages E, F and G. This sleeve valve may be moved and actuated in some convenient known manner. In the combustion chamber is a sparking plug J preferably situated near the fuel injector D.

The construction illustrated is particularly applicable to an engine operating in the manner set forth in the present applicant's copending patent application of the United States of America Serial No. 715,231 in which fuel in a liquid state is injected directly into the cylinder or combustion space and is ignited as a result of the combustion in the cylinder of an admixture of a heating agent such as hydrogen with air which have been drawn into the cylinder either separately or together. When the construction illustrated is applied to such an engine, air is drawn into the cylinder through the passages E while hydrogen enters through the passage F. Owing to the arrangement of the passage F the stream of hydrogen will be directed into the combustion chamber B while the air will flow at first into the cylinder but will be forced by the action of the piston K on its compression stroke through the opening C into the combustion chamber B wherein such turbulence will be caused as will bring about a thorough admixture of the air and hydrogen. The stroke of the piston K is so determined that substantially the whole of the air charge will be compressed into the combustion chamber B. The mixture of air and hydrogen is then ignited by the sparking plug J and the temperature will be raised thereby to such an extent as to cause ignition of the liquid fuel which is injected at the correct moment into the chamber B. The mixture of hydrogen and air is a weak one the excess of air serving for the effective combustion of the liquid fuel. The hydrogen and air mixture is, however, of sufficient strength to serve for running the engine at light loads no liquid fuel being then injected but injection taking place as and when greater power is required. The products of combustion flow out from the cylinder through the passages G.

It is to be understood that this invention is not in any way limited to engines operating in the manner set forth in the present applicant's co-pending patent application of the United States of America above referred to and that a construction of internal combustion engine similar to that described above and illustrated in the accompanying drawings may according to this invention be employed without admission of hydrogen or other heating agent, the ignition of the liquid fuel charge being effected in any convenient manner. Further the details of construction may be varied as found desirable in accordance with the general structure of the engine to which the invention is applied and the purpose for which it is to be used without departing from this invention.

What I claim as my invention and desire to secure by Letters Patent is:—

1. In an internal combustion engine, in combination a cylinder, a combustion chamber, a restricted passage connecting the cylinder with the combustion chamber, means for injecting a charge of fuel in a liquid state directly into the combustion chamber, ports through which gases can enter and leave the cylinder and combustion chamber, at least one of said inflow ports leading directly into the combustion chamber while the others of said entry ports lead into the cylinder, and a sleeve valve controlling all of the inflow and outflow ports.

2. In an internal combustion engine, in combination, a cylinder, a combustion chamber, a restricted passage connecting the cylinder with the combustion chamber, means for injecting a charge of fuel in a liquid state directly into the combustion chamber, a series of radially disposed ports through which the main gaseous part of the charge enters and leaves the combustion chamber and cylinder, at least one of said inlet ports leading directly into the combustion chamber while the others of said entry ports lead into the cylinder, and a sleeve valve controlling all of the inlet and exhaust ports.

3. In an internal combustion engine, in combination, a cylinder, a symmetrical bulb-like combustion chamber having its constricted portion connected to the cylinder chamber, means for injecting a charge of fuel in a liquid state into the combustion chamber, a series of radially disposed ports through which the main gaseous part of the charge enters and leaves the combustion chamber, at least one of said ports leading directly into the combustion chamber, and a sleeve valve controlling the inlet and exhaust ports.

4. In an internal combustion engine, in combination, a cylinder, a symmetrical bulb-like combustion chamber having its constricted portion connected to the cylinder chamber, a fuel sprayer disposed centrally in the combustion chamber, a series of radially disposed ports through which the main gaseous part of the charge enters and leaves the combustion chamber, at least one of said ports leading directly into the combustion chamber, and a sleeve valve controlling the inlet and exhaust ports.

5. In an internal combustion engine, in combination, a cylinder, a spherical combustion chamber, a restricted passage connecting the cylinder with the combustion chamber, means for injecting a charge of fuel in a liquid state directly into the combustion chamber, a plurality of intake ports and a plurality of exhaust ports leading to the cylinder and combustion chamber, at least one of said intake ports leading directly into the combustion chamber, and a sleeve valve disposed concentrically with respect to the cylinder and combustion chamber and controlling the inflow and outflow ports.

6. In an internal combustion engine, in combination, a cylinder, a spherical shaped combustion chamber having a restricted connection with the cylinder chamber, a fuel sprayer disposed centrally in the upper end of the combustion chamber, a plurality of radially disposed intake ports one at least of which enters directly into the combustion chamber, a plurality of radially disposed outlet ports leading from said combustion chamber about its greatest diameter, a sleeve valve disposed concentrically about said cylinder and combustion chamber and controlling the ports of both, said sleeve valve being spaced from the combustion chamber by a distance sufficient to provide water cooling spaces therebetween.

7. In an internal combustion engine, the combination of a cylinder provided with a combustion chamber having restricted communication with a piston chamber, a piston in the piston chamber, means providing for the induction of a gaseous heating agent into the combustion chamber and of air directly into the cylinder during the suction stroke of the piston, means for igniting the mixture of air and gas after substantially all of the air is compressed into the combustion chamber in order to provide high temperature gaseous media including excess air in the combustion chamber, and means for injecting fuel into the high temperature media in the chamber, whereby such fuel is ignited due to the high temperature and combustion of the fuel is efficiently supported.

8. In an internal combustion engine, the combination of a bulb-shaped combustion chamber having restricted communication with a cylinder, a piston in the cylinder, means providing for the induction of hydrogen into the combustion chamber and of air directly into the cylinder during the suction stroke of the piston, means for igniting the mixture of air and hydrogen after substantially all of the air is compressed into the combustion chamber in order to provide high temperature gaseous media including excess air in the combustion chamber, and means for spraying liquid fuel into the high temperature media in the chamber, whereby such fuel is ignited due to the high temperature and combustion of the fuel is efficiently supported.

9. In an internal combustion engine, the combination of a cylinder provided with a combustion chamber having restricted communication with a piston chamber, a piston in the piston chamber, means providing for the induction of a gaseous heating agent into the combustion chamber during the suction stroke of the piston, means providing for the induction of air into the cylinder and between the gaseous heating agent induction means and the piston during the suction stroke of the piston, means for igniting the mixture of air and gaseous heating agent after substantially all of the air is compressed into the combustion chamber in order to provide high temperature gaseous media including excess air in the combustion chamber and means for injecting fuel into the high temperature media in the chamber, whereby such fuel is ignited due to the high temperature and combustion of the fuel is efficiently supported.

10. In an internal combustion engine, the combination of a cylinder provided with a bulb-shaped combustion chamber having restricted communication with a piston chamber, a piston in the piston chamber, means for admitting a gaseous heating agent into the combustion chamber during the suction stroke of the piston, means for admitting air directly to the piston chamber during the suction stroke of the piston, means for igniting the mixture of gaseous heating agent and air in the combustion chamber after substantially all of the air is compressed into the combustion chamber in order to provide high temperature gaseous media including excess air in the combustion chamber, and means for injecting fuel into the high temperature media in the chamber, whereby such fuel is ignited due to the high temperature and combustion of the fuel is efficiently supported.

11. In an internal combustion engine, the combination of a cylinder provided with a combustion chamber having restricted communication with a piston chamber, a piston in the piston chamber, means for admitting a gaseous heating agent into the combustion chamber during the suction stroke of the piston, means for admitting air directly to the cylinder during the suction stroke of the piston, means for igniting the mixture of air and gaseous heating agent in the combustion chamber after substantially all of the air is compressed into the combustion chamber in order to provide high temperature gaseous media including excess air in the combustion chamber, means for injecting fuel into the high temperature media in the combustion chamber, whereby such fuel is ignited due to the high temperature and combustion of the fuel is efficiently supported, and exhaust port means communicating with the combustion chamber and providing for the exhaust of products of combustion from the cylinder during the exhaust stroke of the piston.

12. In an internal combustion engine having ignition and power phases of combustion, in combination, a cylinder including a piston chamber and a combustion chamber connected to the piston chamber by a restricted passage; means for admitting air directly to the cylinder in sufficient quantity to support both phases of combustion; means providing for said ignition phase after air in said cylinder is sufficiently compressed comprising means separate from said air-admission means for injecting gaseous heating agent into said combustion chamber in quantities sufficient to supply highly heated combustion gases resulting from combustion of the gaseous heating agent and a portion of the air; means for igniting and effecting combustion of the mixture of gaseous heating agent and a portion of the air; and means providing for said power phase including means separate from the air-admission means and said gaseous heating agent injection means for injecting liquid fuel into the cylinder for ignition by the high temperature products of combustion of said gaseous heating agent.

13. In an internal combustion engine, the combination of a cylinder, a piston in the cylinder, means providing during the suction stroke for the induction into the cylinder at separate points of a combustible medium and of air in excess of that required for combustion of said medium, a spark plug for igniting the mixture of combustible medium and a portion of the air at the end of the compression stroke in order to provide high temperature gaseous ignition media and excess air, and means for injecting fuel into the high temperature gaseous ignition media in the cylinder, whereby such fuel is ignited due to the high temperature of the gaseous ignition media and combustion of the fuel is effected.

14. In an internal combustion engine having ignition and power phases of combustion, in combination, a cylinder, means for admitting air to the cylinder during the suction stroke and in sufficient quantity to support both phases of combustion, means for admitting a gaseous heating agent at a separate point from that at which air is admitted and nearer to the head end of the cylinder in quantities sufficient to provide high temperature gaseous ignition media, means for igniting the combustible mixture provided by the gaseous heating agent and a portion of the air at the end of the compression stroke in order to provide high temperature gaseous ignition media, and means for injecting liquid fuel into such high temperature gaseous ignition media, whereby ignition of the fuel takes place and the power phase is provided.

In testimony whereof I have signed my name to this specification.

ALAN ERNEST LEOFRIC CHORLTON.